United States Patent [19]
Zugai

[11] 3,861,250
[45] Jan. 21, 1975

[54] TOOL TO LOOSEN FROZEN WORK PIECES

[76] Inventor: John Zugai, 108 Craig Dr., Irwin, Pa. 15642

[22] Filed: May 9, 1973

[21] Appl. No.: 358,642

[52] U.S. Cl. ............................................. 81/52.35
[51] Int. Cl. ............................................. B25b 19/00
[58] Field of Search ................................... 81/52.35

[56] References Cited
UNITED STATES PATENTS

| | | | |
|---|---|---|---|
| 2,539,678 | 1/1951 | Thomas | 81/52.3 |
| 3,323,394 | 6/1967 | Bangerter et al. | 81/52.3 |
| 3,519,087 | 7/1970 | Santi | 81/52.35 |
| 3,576,064 | 4/1971 | Brackin | 81/52.35 |
| 3,577,638 | 5/1971 | Chandler | 81/52.35 |

Primary Examiner—James L. Jones, Jr.
Attorney, Agent, or Firm—Buell, Blenko and Ziesenheim

[57] ABSTRACT

A tool for loosening frozen work pieces such as nuts, bolts and studs from their support structures. The tool has a socket for engaging the head of the piece. The socket has an interior contour corresponding to the shape of the head of the work piece to prevent rotational slippage and has an effective depth of less than the thickness of the head whereby when the socket engages the head, it avoids contact with the support structure retaining the work piece. A vibrating force is applied to the socket along its longitudinal axis thereby imparting the vibrational forces to the work piece causing it to loosen within its support structure.

2 Claims, 2 Drawing Figures

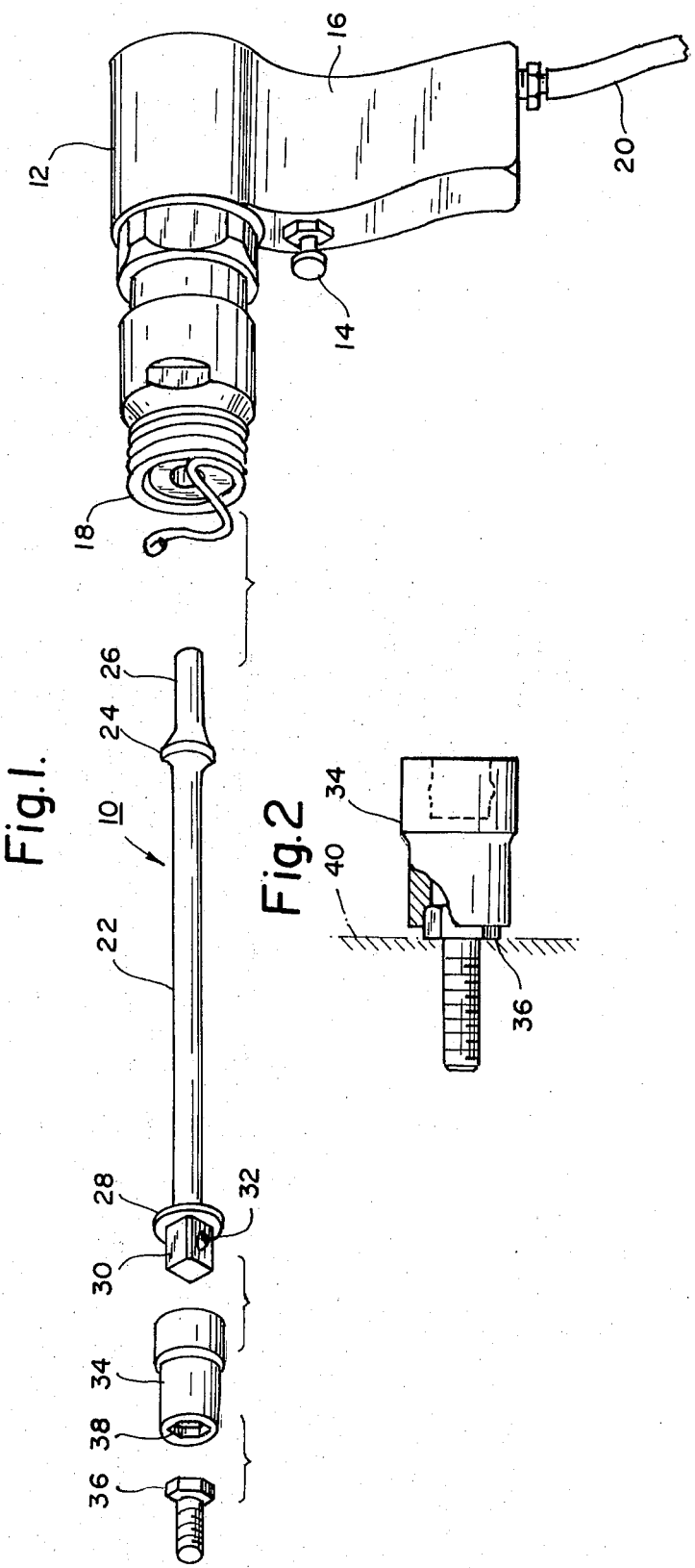

TOOL TO LOOSEN FROZEN WORK PIECES

This invention relates to a tool to loosen frozen work pieces such as nuts, bolts and studs from their support structures. There has been a problem particularly in the automobile engine repair and automobile body repair field for a tool capable of removing frozen nuts and bolts. This has been traditionally accomplished by brute strength applying wrenches, exerting a twisting motion to loosen the nut or the bolt. Usually some lubricant is applied to assist removal of the nut or the bolt which is located in the fender or engine manifold, and which has been corroded within its support structure causing it to be in a "frozen" condition with respect to its support structure such as the fender or the manifold.

Other techniques for removing work pieces such as nuts have been the application of pounding the nut or the bolt with a hammer to remove excess corrosion and oxidation. These have been manual and cumbersome and have also resulted in the shearing of the head from the work piece thereby making removal extremely difficult by requiring drilling of the work piece from the support structure in order to remove it.

The present invention overcomes the problem by providing a device which is capable of applying a high rate of vibrational force uniformly to the head of the work piece without coming into contact with the support structure for the work piece thereby causing the work piece to vibrate about its longitudinal axis and freeing it from its "frozen" condition.

Referring to the drawings, FIG. 1 shows an exploded isometric view of the tool; and FIG. 2 shows an elevation section of the socket used as part of the tool.

Referring to the drawings, the pneumatic tool is generally shown as 10 in FIG. 1. The tool comprises a pneumatic impact gun 12 in the form of a pistol grip 16 with an air valve 14 to which is attached an air line 20 from a source of air not shown. A retaining spring 18 is used to retain an extension adapter rod 22 having a flange 24 which locks within spring 18 when shank 26 is inserted into the spring 18. At the opposite end of the extension rod 22 is a stop collar 28 having a square drive 30 with a retaining ball 32 to receive socket 34 with polygonal internal cavity to engage the head of the bolt 36. Bolt 36 is secured to support structure 40. Bolt 36 is typically found inserted into a manifold, support bracket or a fender of an automobile or any other metal structure which has a tendency to corrode thereby causing a bolt or nut to be in a "frozen" state. Socket 34 is an unconventional socket with a polygonal cavity having a depth slightly more than half of the thickness of the work (or bolt head) as shown in the drawings. This socket is distinguished from a conventional socket which has a cavity depth substantially the same as the thickness of the bolt head.

In operation, the socket cavity 38 is placed over the bolt head 36. The cavity 38 of the socket 34 is of a depth less than the thickness of the head of the nut 36. This prevents the face of the socket 34 coming in contact with the support structure 40 which supports the bolt. When the socket 34 is placed over the bolt head a force at a high vibration rate is applied by the pneumatic impact gun 12. The gun applies a pulsating force along the longitudinal axis of the extension rod 22 through the socket 34 and on the bolt 36 thereby freeing the "frozen" bolt 36 from its supporting structure 40. This then enables one to remove the bolt 36 by the usual wrench.

While I have shown and described certain present preferred embodiments of my invention and methods of practicing the same in the foregoing specification, it will be understood that the invention is not limited thereto but may be otherwise embodied within the scope of the following claims.

I claim:

1. A tool to loosen frozen work pieces having heads such as nuts, bolts and studs from their support structure comprising:
   a. an unconventional socket means for engaging the head of the work piece, the inside cavity of the socket means is polygonal shaped to engage the head of the work piece, and having an effective depth less than a thickness of the head whereby when the socket means engages the head it avoids contact with the support structure retaining the work piece;
   b. an extension rod affixed to the socket means; and
   c. pneumatic gun means applying a high rate of non-rotating vibrating force uniformly to the socket means through the extension rod and along the same longitudinal axis as the socket means whereby the vibrational force is transmitted longitudinally and uniformly to the head of the work piece and vibrates it along its longitudinal axis within its support structure causing it to loosen within the support structure.

2. A tool as recited in claim 1 wherein the extension rod includes a combination stop collar and square member at one end to receive the socket.

* * * * *